United States Patent [19]
Neuner

[11] 3,737,111
[45] June 5, 1973

[54] MEAT CUTTER

[76] Inventor: Hans Neuner, D-3562 Wallau, Lahn Von der Hardt, Germany

[22] Filed: May 10, 1971

[21] Appl. No.: 141,673

[30] Foreign Application Priority Data

May 12, 1970 Germany.....................P 20 23 066.4

[52] U.S. Cl..............................................241/282.2
[51] Int. Cl.............................................B02c 18/10
[58] Field of Search.....................146/67; 241/199.5, 241/199.7, 282.2

[56] References Cited

UNITED STATES PATENTS 588,828    8/1897    Hinrichs................................146/67
1,786,698  12/1930   Burrell..................................146/67

*Primary Examiner*—Willie G. Abercrombie
*Attorney*—Woodhams, Blanchard & Flynn

[57] ABSTRACT

A meat cutter having an annular rotating bowl with cutter members arranged adjacent one side of said bowl. Said cutter members are mounted on a suitable spindle and at least the last pair of cutters, taken in the direction of rotation of the bowl, are arranged for movement in opposite directions with respect to the axis of said spindle. Particularly a push rod coaxial with the spindle, and operable by a cam from a point externally thereof, acts through a linkage adjacent the base of said cutters for effecting the angular positioning of the cutters with respect to the spindle axis.

5 Claims, 7 Drawing Figures

INVENTOR.
HANS NEUNER

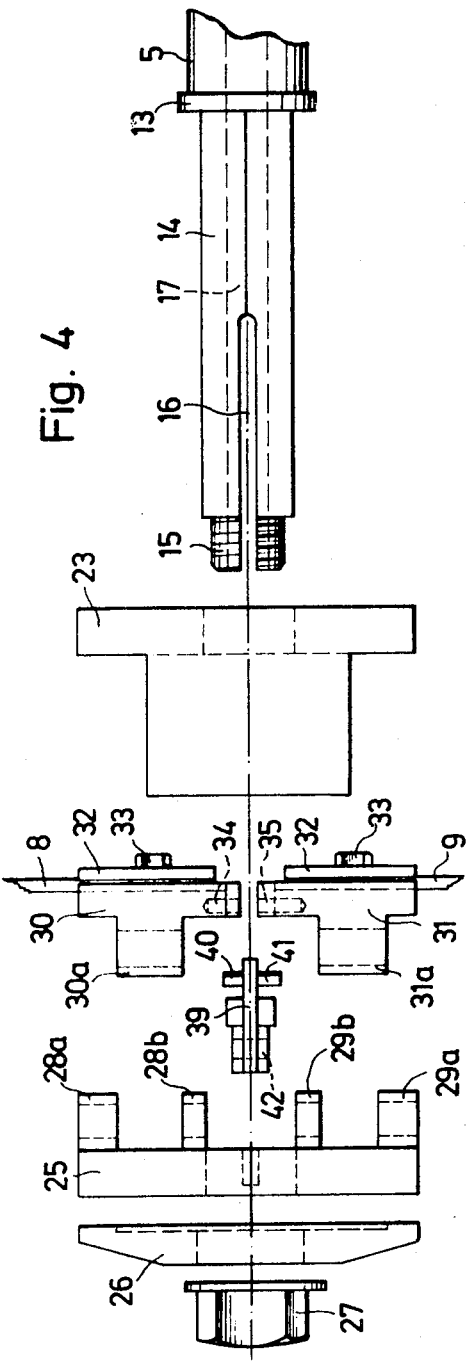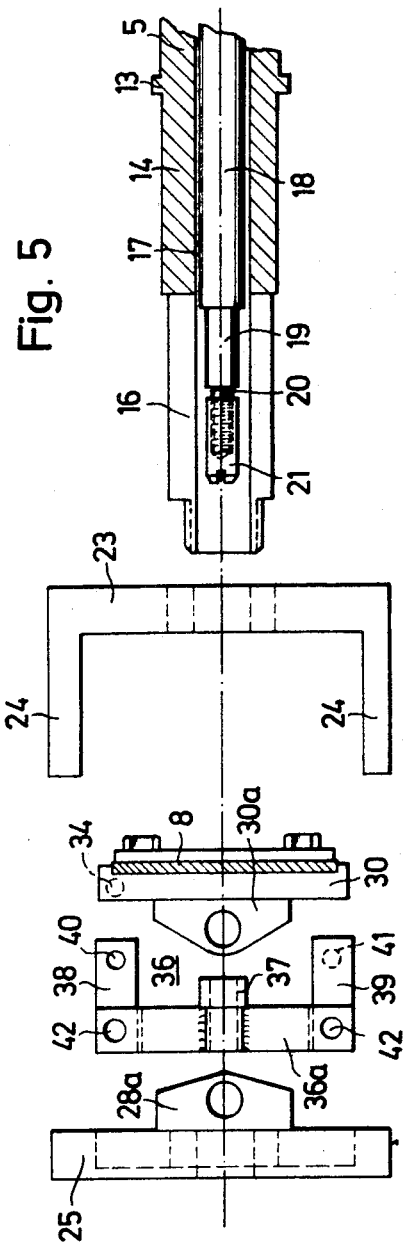

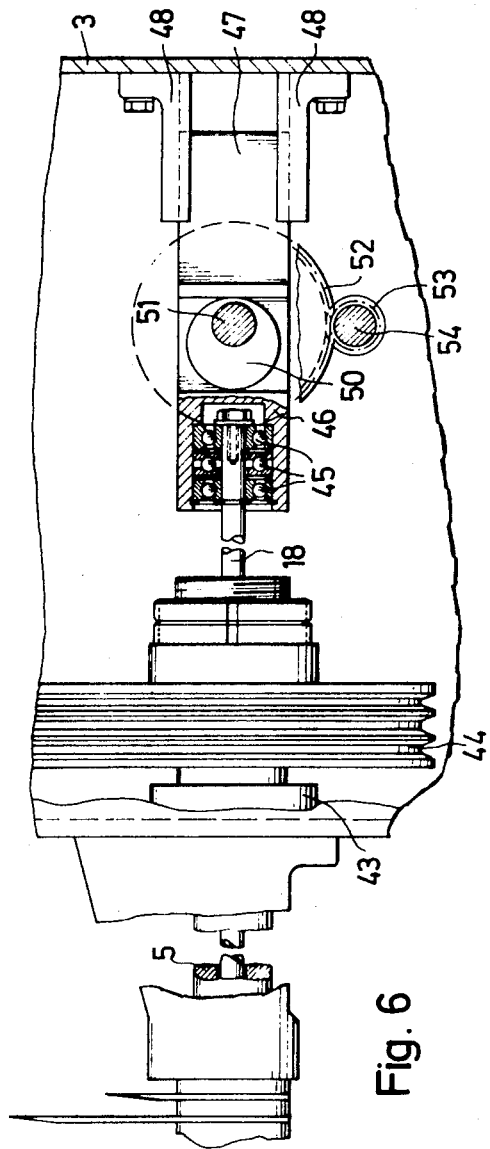
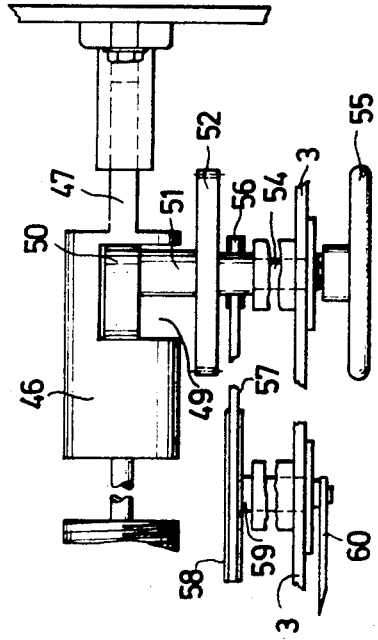

MEAT CUTTER

The invention relates to a meat cutter, and particularly to a meat grinding machine, in which the meat is cut in a rotating bowl by, for example, rapidly rotating, mostly sickle-shaped cutters. The bowl is constructed as an annularly, for example rotatable member with an approximately semicircular diametric section. The cutter spindle is positioned above the bowl and has a cutter head with several pairs of cutters which extend into the bowl. The cutters themselves are covered by a hood which can together with the part of the bowl which is positioned underneath the hood form the so-called cutting zone. The cutters of at least the last pair of cutters, taken in the direction of rotation of the bowl, are pivotable in opposite directions about an axis extending perpendicularly to the axis of the cutter spindle and parallel to the longitudinal direction of the cutters, and the cutters are controlled by means of a control rod which is supported for axial movement in a central bore of the cutter spindle.

The shape and size of the hood, particularly the width of the hood, will materially influence the condition of the meat cut by the cutters. If the width of the hood is large in the circumferential direction of the bowl, then the meat moves through the cutting zone without piling up. Thus the meat is only cut and it separates quickly from the cutters without any appreciable heating. In this manner, one can obtain smooth cut surfaces, as is desirable for example for the manufacture of raw sausage. However, if the width of the hood is short and the spacing of the rotating cutters from the sidewalls of the hood is small, the meat accumulates at the cutters and fills the hood. In such a hood, the meat moves only slowly through the cutting zone which results in the meat being not only cut by the cutters, but also a considerable amount of friction occurs between cutter and meat which friction generates heat within the meat and leads to a good emulsification. A good emulsification is for example a desirable condition for the manufacture of cooked sausage.

In order to satisfy the two contrary requirements on the condition of the meat, it is already known in meat cutters to use exchangeable hoods of different lengths and shape. The exchange of the hood can, however, only be effected when the cutter is not operating. Further, it is time consuming and an exact adjustment to each respective type of meat is not possible. In order to avoid the changing of the hood, it is already known (German Gebrauchsmuster No. 1,884,570) to arrange at the side of the common cutter head movable cutters which are pivotable in their angular position and to make the adjustment of the cutters by means of a push rod located in the cutter spindle. However, this approach has so far been unsuccessful because it was not possible to store within the room available an adjusting mechanism which met the high forces present. The cutters rotate at very high speeds and have a considerable length so that strong flywheel forces act onto the movable cutter holders. In adjusting the cutters, forces occur which act perpendicularly to the cutter surface and which lie in the order of magnitude of 1500 kg. Furthermore, during cutting of baked meat, the high speed of the cutters causes a sudden high stress on the cutters and thus on their mounting.

The purpose of the invention is to provide an adjusting mechanism for adjustable cutters which adjusting mechanism meets all requirements, can be stored within a small area and can be taken apart and reassembled in a simple manner. The easy disassembly is of decisive importance because the cutters must be removed from the cutter spindle at short intervals for the purpose of cleaning and then be replaced.

According to the invention a cutter of the type described above is constructed with at least one adjustable pair of cutters in such a manner that the pivotable cutters are arranged on suitable holders which are supported pivotably about an axis which is spaced from the cutters in a base plate positioned fixed with respect to rotation on the cutter spindle, and that an adjusting member which is guided in a slot of the cutter spindle is mounted on a push rod and extends transversely to the cutter spindle, is hingedly connected at its ends each to one cutter holder through lugs.

Due to the precisely adjustable inclination of the cutters of at least one pair thereof in the one or in the other direction during the operation of the cutter, either an accumulation or a loosening of the meat can be achieved depending on the requirements which are to be met.

One exemplary embodiment of the invention will be described hereinafter in connection with the drawings, in which:

FIGS. 4 and 5 are side and top views of the adjustable cutters of the cutter head including their adjusting parts, FIG. 6 is a partially sectioned side view of the adjusting mechanism of the pair of cutters, and FIG. 7 is a top view of the adjusting mechanism according to FIG. 6.

Figure 1:
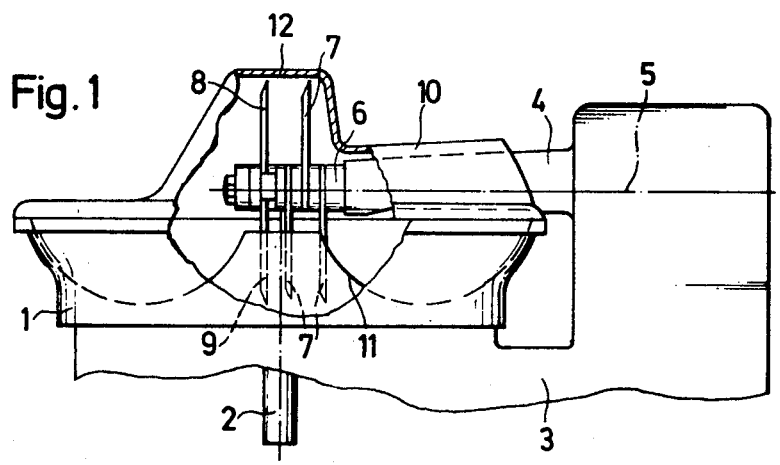
FIG. 1 is a side view of the important parts of a meat cutter.
Figure 2:
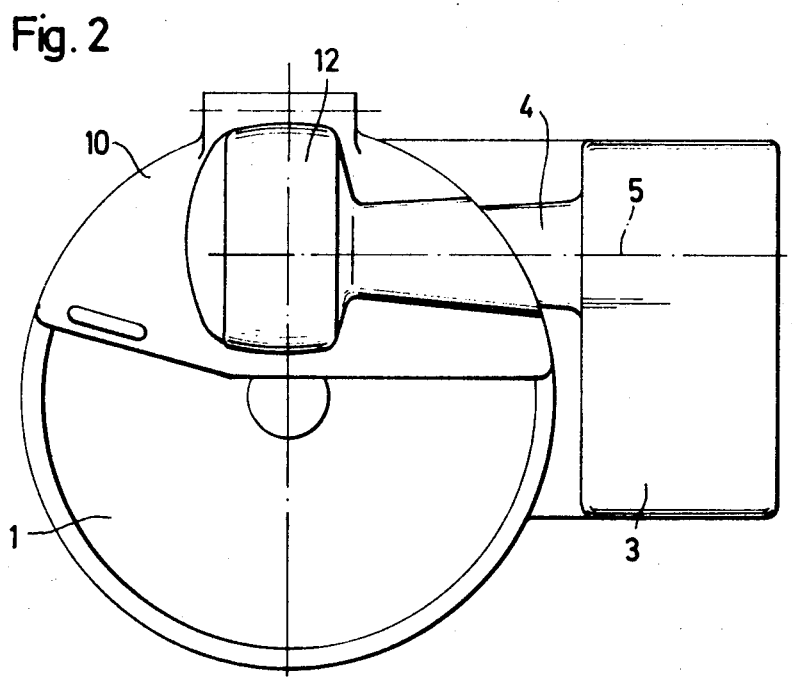
FIG. 2 is a top view of the meat cutter.

According to FIG. 1, the meat cutter has a rotating bowl 1. The driving shaft 2 of said bowl is supported in a conventional manner in the housing 3 of the cutter. The sidewall of the bowl is partly broken out in order to show the semicircular diametric section of the annular bowl. A cutter spindle 5 which is indicated by a dash-dotted line in FIG. 1 is supported in an arm 4 of the housing 3. The cutter spindle carries at its front end a cutter head 6 which has multiple stationary cutters 7 and a pair of pivotable cutters 8 and 9. The cutter spindle 5 is, as illustrated in FIG. 2, positioned above the bowl 1 and is covered by a lid 10, the sidewall of which is partially broken out in FIG. 1 in order to show the cutter head.

During operation, the bowl 1 which is filled with pieces of meat rotates while simultaneously therewith the cutter spindle 5 is driven at a high speed. The pieces of meat reach (arrive) thereby underneath the hood and are comminuted therein by the rotating cutters 7, 8 and 9. The cutter points describe a circle which corresponds approximately to the circular arc 11 of the bowl cross section. The hood 10 covers slightly less than half of the bowl, the cutters themselves rotate in a housing-shaped part 12 of the bowl which, taken in the direction of rotation of the bowl, is not much larger than the length of the cutter head.

The front end of the cutter spindle 5 (FIG. 4) forms a flange 13, which separates the round part of the cutter spindle from a hexagonal part 14. The circular part 15 is threaded. A longitudinal slot 16 starts at the front end of the spindle. The spindle itself has an opening 17 extending therethrough (FIG. 5). A push rod 18 is movably supported in this opening. Said push rod has a part 19 of reduced diameter and a threaded end 20 with a nut 21.

Figure 3:
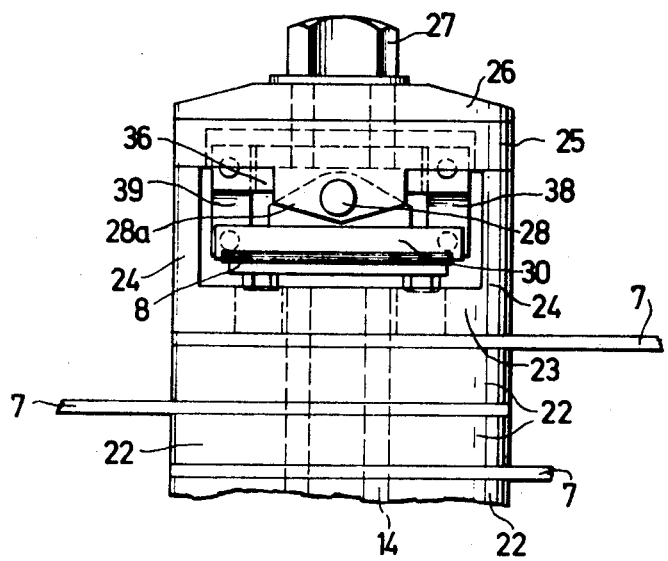
FIG. 3 is a top view of the front end of the cutter head.

As shown in FIG. 3, the cutters 7 are installed with cutter holders 22 onto the hexagonal part 14 of the cutter spindle so that they are connected against rotation with respect to the hexagonal part of the spindle. A support plate 23 (FIG. 4) with annularly segmental and axially directed shoulders 24 is positioned on the same part 14. The support plate 23 is thus also connected rotationally fixed with respect to the cutter spindle. A base plate 25 and a thrust washer 26 are also positioned on the spindle part 14. The base plate is urged by a nut 27 acting through thrust washer 26 axially against the front surfaces of the shoulders 24. At the same time the holders 22 of the cutters 7 are in this manner fixed in the axial direction.

The base plate 25 has four coaxial bearing eyes 28a, 28b or 29a, 29b. A cutter holder 30 or 31 of one of the cutters 8 or 9 is pivotably supported with bearing eyes 30a, 31a received respectively between pairs of the above named bearing eyes by means of a pin 28 (FIG. 3). Each cutter is secured in its cutter holder by means of a pressure plate 32 on a nut 33. The cutter holders 30, 31 are positioned on both sides of a plane intersecting the axis of the cutter spindle and are spaced from one another. Each cutter holder 30 or 31 has a bore 34 or 35 which are both positioned on opposite sides of the cutter spindle.

An adjusting member 36 with a web 36a and a hub 37 is positioned on the smaller part 19 of the push rod 18. The web 36a is fixed in axial direction by the nut 21. The web carries at each end a lug 38 or 39 with pins 40, 41. The lugs are pivotable about pins 42 of the web 36a. The pin 40 engages the bore 34 of the cutter holder 30 and the pin 41 engages the bore 35 of the cutter holder 31.

As can be recognized from FIGS. 3 to 5, an axial movement of the push rod 18 effects a reciprocal pivoting of the cutter holders 30 and 31 about their common pivot axis and thus controls the inclination of the cutters to their plane of rotation.

FIG. 6 illustrates a part of the cutter housing 3 which receives the bearing 43 of the cutter spindle 5 and a V-belt pulley 44 positioned on the spindle 5. As can be seen in FIG. 6, the push rod 18 is rotatably supported in a cylindrical sleeve 46 through several ball bearings 45. The sleeve itself is supported for axial movement by a flat shoulder 47, but is fixed with respect to rotation, in two brackets 48 which are secured to one wall of the housing 3. The sleeve 46 has a cutout 49 which receives an eccentric disk 50 with its driving shaft 51. A gear 52 is positioned on this shaft, which gear is driven by a second gear 53 by means of a shaft 54. The shaft 54 carries a handwheel 55. A V-belt pulley 56 is positioned on the shaft 54. Said V-belt pulley drives through a V-belt 57 a second pulley 58. Said pulley is positioned on a shaft 59 which is also supported on the housing 3 and carries outside the housing a pointer 60 which, in connection with a not illustrated scale, indicates the angle of adjustment of the cutters 8 and 9. The inclination of the cutters can be adjusted very precisely during operation, namely with rotating cutter spindle, by means of the handwheel 55.

I claim:

1. In a meat cutter having an annular, rotating meat bowl, and a rotatable cutter spindle which is positioned above the bowl and carrying a cutter head, a hood for covering the said cutter head, said cutter head having a plurality of cutter pairs thereon of which at least the last cutter pair, taken in the direction of rotation of said bowl, consists of cutters which are pivotable in opposite directions about an axis which extends perpendicularly to the axis of said cutter spindle and parallel to the longitudinal direction of the cutters and push rod means movably supported in a central bore of said cutter spindle, the improvement comprising:

cutter blade holding means;
base means fixed to said cutter spindle and rotatable therewith;
pivotal support means for pivotably supporting said cutter blade holding means on said base means;
means defining an axially extending slot in said cutter spindle;
adjusting means supported for axial movement relative to said cutter spindle in said slot; and
pivotal connecting means for pivotally connecting said adjust means to said cutter blade holding means, an axial movement of said adjusting means effecting a pivotal movement of said cutter blade holding means.

2. The improvement according to claim 1, wherein said pivotal support means comprises first hinge means on said base means defining one half of a hinged joint and second hinge means on said cutter blade holding means defining the other half of said hinged joint.

3. The improvement according to claim 2, wherein the axis of said hinged joint intersects the axis of rotation of said cutter spindle.

4. The improvement according to claim 2, wherein said cutter blade holding means comprises a pair of cutter blade holders;

wherein said connecting means comprises a thin, generally C-shaped member, said adjusting means being connected to said C-shaped member at the midpoint thereof so that the opposite ends thereof extend laterally of the axis of rotation of said cutter spindle, one end of said C-shaped member being pivotally secured to one of said cutter blade holders, the opposite end of said C-shaped member being pivotally secured to the other of said cutter blade holders.

5. The improvement according to claim 4, wherein said pair of cutter blade holders include means defining one half of a hinged joint and wherein said opposite ends of said C-shaped member includes means defining the other half of said hinged joint, said axial movement of said adjusting means effecting a pivotal movement of said pair of cutter blade holders in opposite directions about the pivot axis for said cutter blade holders.

* * * * *